US010650776B1

(12) United States Patent
Tsuchihashi et al.

(10) Patent No.: US 10,650,776 B1
(45) Date of Patent: May 12, 2020

(54) INFORMATION PROCESSING DEVICE AND CONTROLLING METHOD FOR MULTIPLE OPERATING SYSTEMS

(71) Applicant: LENOVO (SINGAPORE) PTE. LTD., Singapore (SG)

(72) Inventors: Moriyuki Tsuchihashi, Yokohama (JP); Kazuo Fujii, Yokohama (JP); Koji Kawakita, Yokohama (JP); David William Douglas, Morrisville, NC (US)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 0 days.

(21) Appl. No.: 16/236,059

(22) Filed: Dec. 28, 2018

(51) Int. Cl.
*G09G 5/14* (2006.01)
*G06F 9/455* (2018.01)
*G06F 9/54* (2006.01)
*G09G 5/00* (2006.01)
*G06F 1/16* (2006.01)

(52) U.S. Cl.
CPC ........ *G09G 5/003* (2013.01); *G06F 1/1616* (2013.01); *G06F 9/45537* (2013.01); *G06F 9/544* (2013.01); *G09G 5/14* (2013.01); *G09G 2310/08* (2013.01)

(58) Field of Classification Search
None
See application file for complete search history.

(56) References Cited

U.S. PATENT DOCUMENTS

| 7,136,282 | B1* | 11/2006 | Rebeske | G06F 1/1616 361/679.55 |
| 10,027,351 | B1* | 7/2018 | Qureshi | H04B 1/0003 |
| 2007/0038939 | A1* | 2/2007 | Challen | G05B 15/02 715/734 |
| 2012/0081380 | A1* | 4/2012 | Reeves | H04L 67/1095 345/541 |
| 2013/0176492 | A1* | 7/2013 | Kurosaki | H04N 5/44543 348/552 |
| 2015/0130824 | A1* | 5/2015 | Lee | G06T 1/60 345/534 |

FOREIGN PATENT DOCUMENTS

JP 2006277204 A 10/2006

* cited by examiner

*Primary Examiner* — Joni Hsu
(74) *Attorney, Agent, or Firm* — Shimokaji LLP

(57) ABSTRACT

An information processing device includes: a timing controller; a system device; and a display panel. The system device operates in accordance with at least a first operating system (OS) and a second OS, and outputs first original image data from the first OS and second original image data from the second OS to the timing controller. The display panel includes a plurality of pixels arranged in a predetermined display area. The timing controller includes: a memory; a writing unit; and a reading unit. The memory has a storage area associated with the display area. The writing unit stores the first original image data in a first individual storage area assigned to the first OS in the storage area, and stores the second original image data in a second individual storage area assigned to the second OS in the storage area. The reading unit reads image data stored in the storage area, frame by frame, and outputs the image data to the display panel.

6 Claims, 12 Drawing Sheets

| ID | DEGREE OF PRIORITY | OS | ORIGIN | SIZE |
|---|---|---|---|---|
| 1 | 3 | OS2 | (0,0) | (1920,1400) |
| 2 | 2 | OS1 | (0,0) | (1920,320) |
| 3 | 1 | OS2 | (0,320) | (1920,1080) |

| ID | DEGREE OF PRIORITY | OS | ORIGIN | SIZE |
|---|---|---|---|---|
| 1 | 3 | OS2 | (0,0) | (2560,1486) |
| 2 | 2 | OS1 | (0,0) | (2560,46) |
| 3 | 1 | OS2 | (0,320) | (2560,1440) |

| ID | DEGREE OF PRIORITY | OS | WRITING AREA/SOURCE | | DESTINATION | |
|---|---|---|---|---|---|---|
| | | | ORIGIN | SIZE | ORIGIN | SIZE |
| 1 | 5 | OS2 | (0,0) | (1920,1400) | — | — |
| 2 | 4 | OS1 | (0,0) | (1920,320) | — | — |
| 3 | 3 | OS2 | (0,320) | (1920,1080) | — | — |
| 4 | 2 | OS1,OS2 | (0,0) | (1920,320) | (880,480) | (960,160) |
| 5 | 1 | OS1,OS2 | (880,480) | (960,160) | (0,0) | (1920,320) |

INFORMATION PROCESSING DEVICE AND CONTROLLING METHOD FOR MULTIPLE OPERATING SYSTEMS

FIELD OF THE INVENTION

The present invention relates to information processing devices and controlling methods.

BACKGROUND OF THE INVENTION

Conventionally an information processing device has been proposed, which configures a plurality of types of operating systems (OSs) and is operable independently in accordance with each OS. Such an information processing device can implement the utility form of each of the plurality of OSs so as not to make a user aware of the existence of the plurality of OSs or differences of their functions. More specifically this information processing device can offer a function suitable for the job at office in accordance with a first OS and a communication function when a user is on the go in accordance with a second OS.

Japanese Unexamined Patent Application Publication No. 2006-277204 describes a portable communication terminal device that includes a portable terminal application program (AP) for radio communication, a portable terminal OS, a data processing OS for data processing, and virtual machine-constituted software. The portable terminal OS provides basic functions that the portable terminal APs commonly use. The data processing OS provides basic functions that the data processing APs commonly use, and manages the data processing APs. The virtual machine-constituted software allows hardware including the data processing OS to simulate hardware of a virtual machine so as to execute the data processing OS.

This information processing device typically includes a system device and one display unit. The system device operates in accordance with each of the OSs to give an image signal to the display unit. The signal image indicates information to make letters and patterns (hereinafter collectively called images) visible.

SUMMARY OF THE INVENTION

The conventional information processing device, however, is not sufficient for the function of enabling each OS to have an independent format and timing of an image signal that is given to the display unit. For instance, the display unit can receive independently a first image signal based on MIPI (Mobile Industry Processor Interface (registered trademark)) standard from a first AP running on Android (registered trademark) as the first OS and a second image signal based on eDP (embedded Display Port (registered trademark)) from a second AP running on Windows (registered trademark) as the second OS.

If the display unit includes a first timing controller (T-Con: Timing Controller) to receive the first image signal and a second T-Con to receive the second image signal, the number of components increases. This inhibits economical mounting and miniaturization of the display unit. Meanwhile an OS or a program executed on the OS has individually specified size and position of their display area of the image. Since the display area is not adjusted among the OSs, the one display unit may fail to display a part of the image.

To solve the above-stated problem, an information processing device according to a first aspect of the present invention includes: a timing controller; a system device that operates in accordance with at least each of a first operating system (OS) and a second OS and outputs first original image data from the first OS and second original image data from the second OS to the timing controller; and a display panel including a plurality of pixels arranged in a predetermined display area, wherein the timing controller includes: a memory having a storage area associated with the display area; a writing unit that stores the first original image data in a first individual storage area assigned to the first OS in the storage area and stores the second original image data in a second individual storage area assigned to the second OS in the storage area; and a reading unit that reads image data stored in the storage area frame by frame, and outputs the image data to the display panel.

The information processing device further may include: a register that stores a plurality of pieces of assignment information beforehand, each of the plurality of pieces of assignment information including OS information, an origin position and a size of an image that can be assigned; and the writing unit may select pieces of assignment information to display the first original image data and the second original image data from the plurality of pieces of assignment information, and store the first original image data and the second original image data in respective individual storage areas in accordance with the selected pieces of assignment information.

In the information processing device, the plurality of pieces of assignment information may further include information on a degree of priority, and when a plurality of individual storage areas is assigned to an overlapping area of the storage area, the writing unit may store data in the overlapping area while prioritizing an individual storage area corresponding to a piece of assignment information having a higher degree of priority.

In the information processing device, at least one piece of the plurality of pieces of assignment information may be copy assignment information to display copy image data that is obtained by copying at least a part of at least one of the first original image data and the second original image data, and when the writing unit selects the copy assignment information, the writing unit may perform copy processing to store the copy image data in an individual storage area in accordance with the copy assignment information.

The information processing device may further include: a pair of chassis that can be folded via a hinge; and a sensor unit that detects whether the chassis is folded or not, wherein the display area includes a first display area that is shielded when the pair of chassis is folded and a second display area that is exposed when the chassis are folded; and when the pair of chassis is folded, the writing unit may select the copy assignment information associated with the second display area and perform the copy processing.

The information processing device may further include: a touch sensor that detects a contact position in the display area that is in contact with another object; and a contact controller that outputs position information indicating the contact position to the system device, wherein when the writing unit performs the copy processing, and when the second display area includes the contact position, the contact controller may convert the contact position into a corresponding position in the first display area where original image data as a source of copy is displayed.

A method for controlling according to the second aspect of the present invention is a control method in an information processing device. The information processing device includes: a timing controller; a system device that operates in accordance with at least each of a first operating system (OS) and a second OS and outputs first original image data from the first OS and second original image data from the second OS to the timing controller; and a display panel including a plurality of pixels arranged in a predetermined display area, the timing controller having a storage area associated with the display area. The timing controller performs: a first step of storing the first original image data in an individual storage area assigned to the first OS in the storage area and storing the second original image data in an individual storage area assigned to the second OS in the storage area; and a second step of reading image data stored in the storage area frame by frame, and outputting the image data to the display panel.

The above-described aspects of present invention can display images from at least a first OS and a second OS collectively on a single display unit without changing the functions of the OSs.

DETAILED DESCRIPTION OF THE INVENTION

Embodiments

Figure 1:
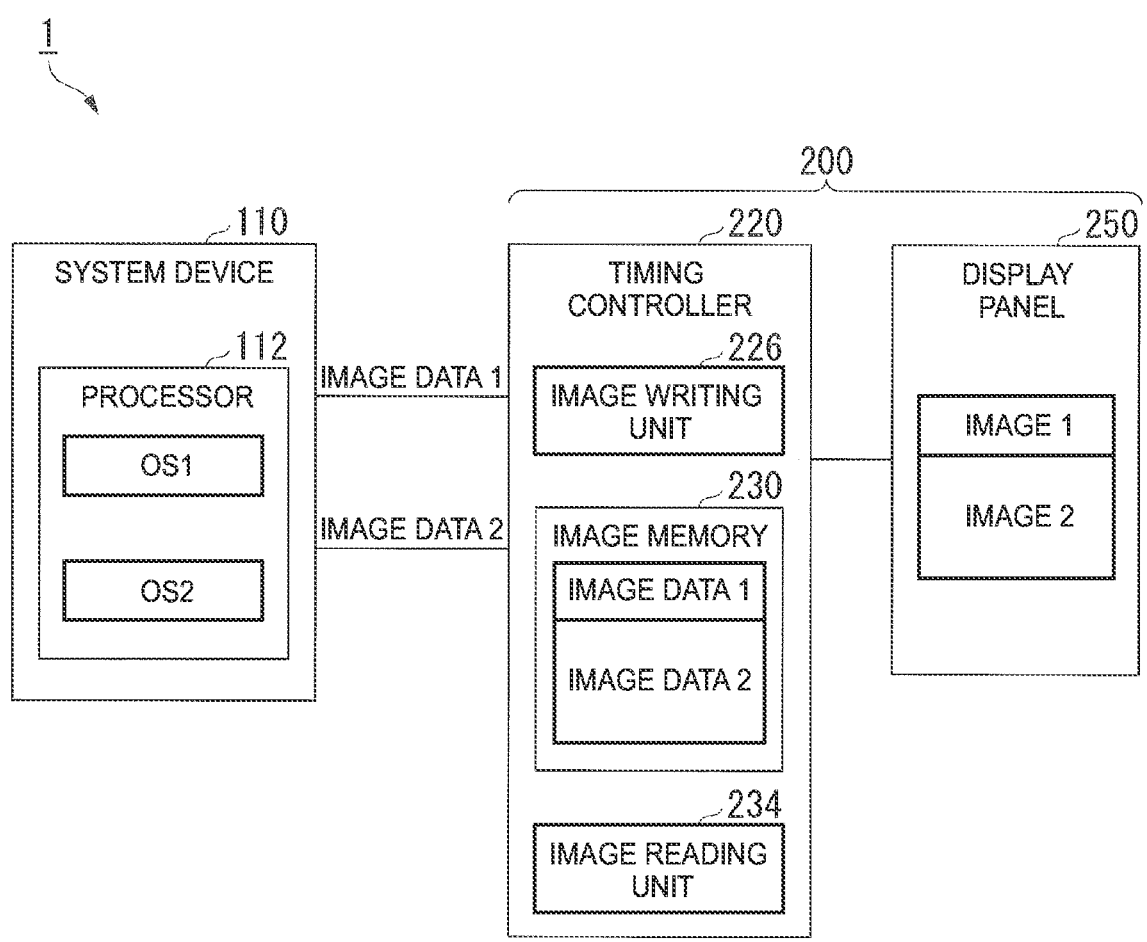
FIG. 1 shows the outline of the present embodiment.

Firstly the outline of the present embodiment is described below. FIG. 1 shows the outline of the present embodiment.

The information processing device 1 according to the present embodiment includes a system device 110 and one display unit 200. The system device 110 includes at least one processor 112. The processor 112 operates in accordance with each of a plurality of OSs and provides basic functions independently among the OSs. FIG. 1 shows an example where the processor 112 executes OS1 and OS2. In the present application, "executing a program" means operation in accordance with an instruction described in the program (including various types of OSs and APs). The basic functions include provision of standard interface to the AP and management of various types of resources in the system device 110 and other hardware connected to the system device 110. The processor 112 can execute other programs (including APs) on each of the OSs. In the present application "executing a program on an OS" means that execution of the OS provides an interface and a resource to the program and the program is executed using the provided interface and resource. In the following description, execution of an OS by a processor and execution of another program on the OS are called "execution in accordance with the OS". The processor 112 may execute in accordance with each of the OSs and create image data in a common basic format (hereinafter this may be called "original image data"). The original image data contains a signal value of each of a plurality of pixels for each frame. Each of a plurality of horizontal synchronization signals corresponds to a different line. The number of the horizontal synchronization signals in one frame corresponds to the number of pixels in the vertical direction, and the number of signal values in one line corresponds to the number of pixels in the horizontal direction. A signal value for each pixel is a RGB value, for example. The processor 112 converts the created format of the original image data to a predetermined format for each OS. The processor 112 then outputs the image data obtained by the conversion to the display unit 200 independently for each of the OSs. In the example of FIG. 1, image data 1 acquired by execution of OS1 or of AP1 (not illustrated) on the OS1 and image data 2 acquired by execution of OS2 or AP2 (not illustrated) on OS2 are independently output. In the following description, the original image data before conversion to image data 1 and image data 2 may be called original image data 1 and original image data 2, respectively.

The display unit 200 includes one timing controller 220 and one display panel 250. The timing controller 220 includes an image writing unit 226, an image memory 230 and an image reading unit 234.

The image writing unit 226 receives image data output from the system device 110 for each of the OSs as an input. The image writing unit 226 then stores the image data for each OS in an individual storage area assigned to the OS of the storage area in the image memory 230. In the example of FIG. 1, image data 1 and image data 2 are stored in their individual storage areas assigned to OS1 and OS2, respectively. The storage area of the image memory 230 is associated with the display area of one-frame image of the display panel 250. In the image memory 230, image data 1 and image data 2 that are stored in their individual storage areas are combined as image data of one frame.

The image reading unit 234 reads the image data stored in the image memory 230 at predetermined frame periods, and outputs the read image data to the display panel 250.

The display panel 250 displays an image based on the image data input from the timing controller 220. In the example of FIG. 1, image 1 based on image data 1 and image 2 based on image data 2 are placed in the display areas corresponding to their individual storage areas.

Figure 6:
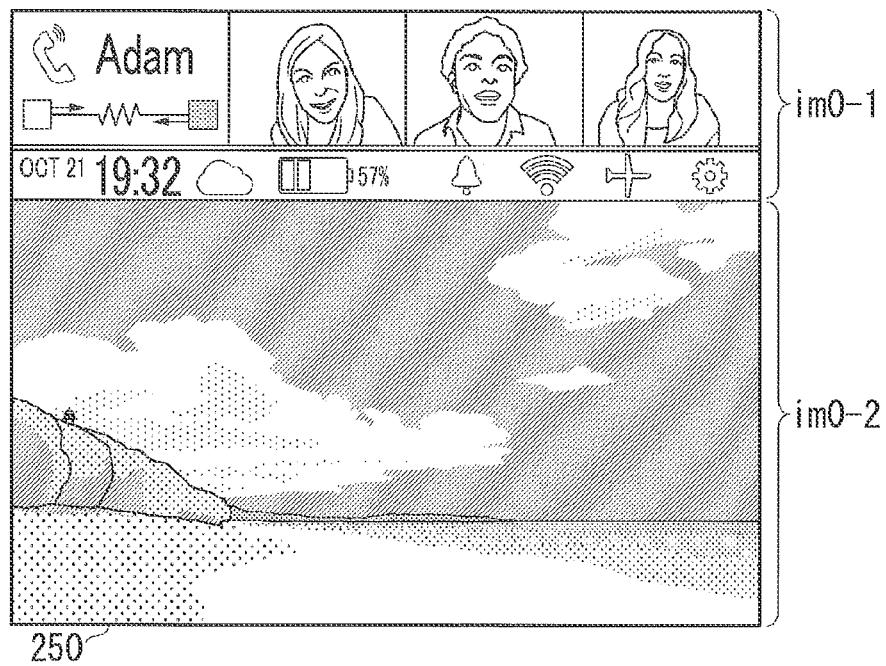
FIG. 6 shows a first display example of an image according to the present embodiment.
Figure 19:
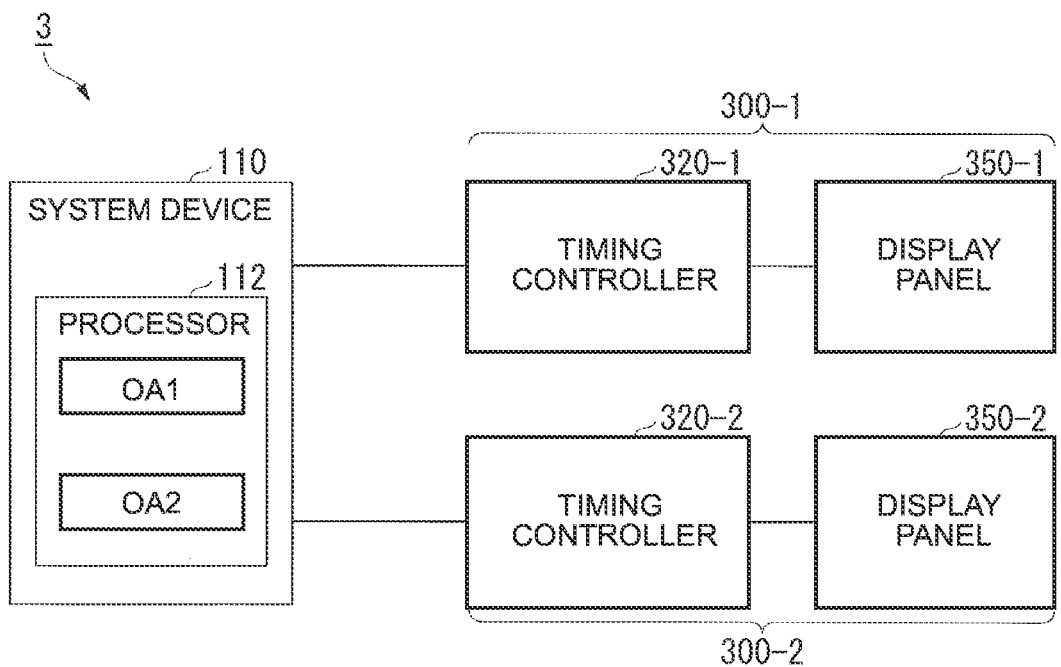
FIG. 19 shows another example of the information processing device.
Figure 20:
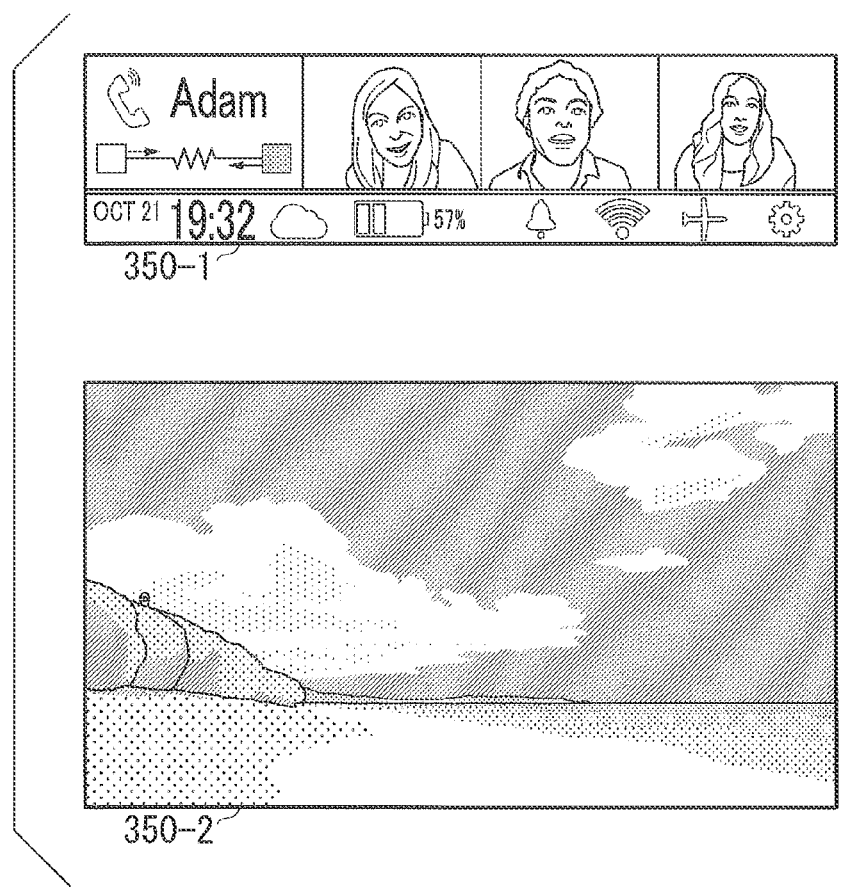
FIG. 20 shows another display example of an image in the display unit.

In other words, the timing controller 220 assigns image data from each OS to the predetermined individual storage area for the OS, and provides image data on an image of each frame that is obtained by combining these image data for the plurality of OSs to the display panel 250. In this way, the timing controller 220 can display an image provided for each of the plurality of OSs on the single display unit 200 without changing the functions of the OSs. For instance, the display panel 250 can display images 1 and 2 based on image data 1 and 2 in their individual display areas im0-1 and im0-2, respectively (FIG. 6). That is, the information processing device 1 of the present embodiment does not require a plurality of display units 300-1 and 300-2 as in the information processing device 3 (FIG. 19 and FIG. 20) to display images 1 and 2. This means that the present embodiment can contribute to reduction of the number of components and miniaturization of the device. In addition, synchronization is not always required between provision of image data for each OS from the system device 110 and provision of image data to the display panel 250.

(Examples of Configuration)

Figure 2:
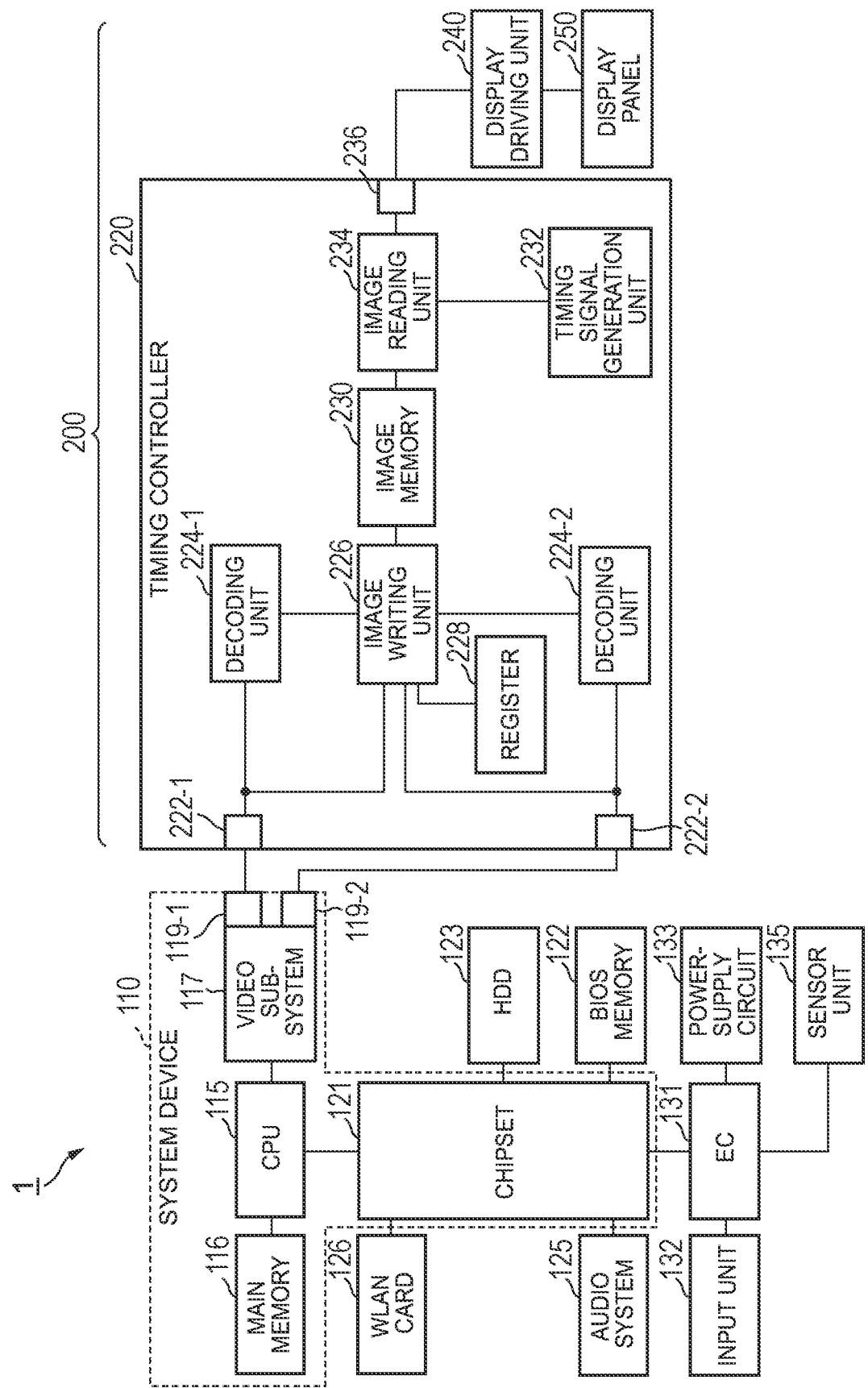
FIG. 2 is a block diagram schematically showing one example of the functional configuration of the information processing device according to the present embodiment.

Next the following describes an example of the functional configuration of the information processing device 1 according to the present embodiment. FIG. 2 is a block diagram schematically showing one example of the functional configuration of the information processing device 1 according to the present embodiment.

The system device 110 includes a CPU (Central Processing Unit) 115, a main memory 116, a video subsystem 117, a plurality of image output units 119 and a chipset 121. The CPU 115 and the video subsystem 117 correspond to the processor 112 as stated above.

The CPU 115 executes the processing designated by an instruction described in various types of programs to control the overall operation of the information processing device 1.

The main memory 116 is used for reading and writing of various types of data that are used for the processing by the CPU 115. The main memory 116 operates as a reading area of a program of the CPU 115 or a writing and working area of data used for the processing by the CPU 115 or data created during the processing. The main memory 116 includes one or more DRAMs (Dynamic Random Access Memory), for example. Execution programs executed by the CPU 115 include OSs, a driver to control the operation of peripherals, and various types of APs. The CPU 115 enables execution of a plurality of OSs at the same time and enables execution of individual drivers and application programs on the OSs specific to them. The plurality of OSs includes Windows (registered trademark) and Android (registered trademark). The following describes the case where the CPU 115 mainly executes two types of OSs, including "OS1" and "OS2".

The video subsystem 117 is a subsystem to implement the functions relating to image displaying, and includes a video controller and a video memory. The video controller is called a GPU (Graphic Processing Unit) as well. The video controller processes a drawing instruction from the CPU 115 independently for each OS, and writes image data of one stream obtained by the processing in a video memory. The video controller reads image data from the video memory and converts the read image data to one stream of image data in a predetermined format for each OS. The video controller outputs the converted one stream of image data to the display unit 200 via the image output unit 119 independently for each OS. In the following description, image data corresponding to OS1 is called image data 1, and image data corresponding to OS2 is called image data 2. The format of image data 1 is specified by the MIPI standard, for example. The format of image data 2 is specified by the eDP standard, for example. Each standard specifies the group of the frame rate, the size and the bit depth of an image.

A plurality of image output units 119 is interface to output image data from the video subsystem 117 to the display unit 200. The plurality of image output units 119 outputs a plurality of image data each having a different format, in parallel, to the display unit 200. The number of the image output units 119 may be equal to the number of OSs that are operable in the system device 110 or may be more than the number of the OSs.

FIG. 2 shows an example of the two image output units 119. The two image output units 119 are designated as image output units 119-1 and 119-2. These image output units 119-1 and 119-2 output image data 1 and 2, respectively, input from the video subsystem 117 to the display unit 200.

The chipset 121 includes one or more controllers and is connected to various devices. The controller is any one of the controllers, such as USB (Universal Serial Bus), serial ATA (Advanced Technology Attachment), SPI (Serial Peripheral Interface) bus, PCI (Peripheral Component Interconnect) bus, PCI-Express bus, or LPC (Low Pin Count) bus, or a combination of them. In the example of FIG. 2, the information processing device 1 includes a BIOS memory 122, a HDD123, an audio system 125, a WLAN card 126 and an EC 131. These devices are connected to the chipset 121.

The BIOS (Basic Input Output System) memory 122 stores BIOS and system firmware to control the EC 131 or the like. For instance, the BIOS memory 122 includes a non-volatile memory that is electrically rewritable, such as an EEPROM (Electrically Erasable Programmable Read Only Memory) or a flash ROM (Read Only Memory).

The HDD (Hard Disk Drive) 123 stores various types of OSs, driver software, service/utility software, APs and various types of data. The HDD 123 is one example of a non-volatile storage medium. The information processing device 1 may include another form of non-volatile storage medium (e.g., SSD (Solid State Drive)) instead of the HDD 123 or together with the HDD 123.

The audio system 125 records or inputs/outputs audio data and reproduces sounds based on the audio data. The audio system 125 is connectable to a microphone and a speaker. The audio system 125 receives audio data from the microphone as an input. The audio system 125 outputs audio data to the speaker and makes the speaker reproduce sounds based on the audio data.

The WLAN (Wireless Local Area Network) card 126 connects to wireless LAN to transmit or receive various types of data.

The EC (Embedded Controller) 131 monitors and controls the operating state of various types of devices connected thereto irrespective of the operating state of the information processing device 1. The EC 131 controls activation and stop of the system device 110 in response to an input signal from the input unit 132, for example.

In the example of FIG. 2, the information processing device 1 further includes the input unit 132, a power-supply circuit 133 and a sensor unit 135. These devices are connected to the EC 131.

The EC 131 controls the supply of electric power from the power-supply circuit 133 in accordance with the operating state of various types of devices. The EC 131 may control the operation of the system device 110 in accordance with a detection signal from the sensor unit 135.

The input unit 132 receives an operation by a user, and outputs an input signal corresponding to the received operation to the EC 131. The input unit 132 is an input device, such as a power-supply switch or a function switch.

The power-supply circuit 133 converts voltage of AC power supplied from the outside to DC power having a predetermined plurality of levels of voltage. The power-supply circuit 133 includes an AC (Alternating Current)/DC (Direct Current) adaptor, a DC/DC converter and a charge-discharge unit. The power-supply circuit 133 supplies electricity necessary for the operation to each of the parts of the information processing device 1 under the control of the EC 131.

The sensor unit 135 detects environmental information indicating the ambient environment and the usage environment of the information processing device 1. The sensor unit 135 outputs a detection signal indicating the detected environmental information to the system device 110. An example of the sensor unit 135 is described later.

The display unit 200 includes the timing controller 220, a display driving unit 240 and the display panel 250.

The timing controller 220 includes a plurality of image input units 222, a plurality of decoding units 224, the image writing unit 226, a register 228, the image memory 230, a timing signal generation unit 232, the image reading unit 234, and an image output unit 236. The number of the image input units 222 and the number of the decoding units 224 may be equal to the number of the image output units 119. The example of FIG. 2 includes two image input units 222 and two decoding units 224. The two image input units 222 are designated as image input units 222-1 and 222-2. The two decoding units 224 are designated as decoding units 224-1 and 224-2.

The plurality of image input units 222 is interface to output image data in a predetermined format input from the system device 110 to the decoding units 224. The format of each image data is associated with the corresponding OS as stated above. The image input units 222-1 and 222-2 output image data 1 and 2 that are input from the system device 110 to the decoding units 224-1 and 224-2, respectively.

The plurality of decoding units 224 decodes the image data in a predetermined format specific to the OS that is input from the image input unit 222 and converts it into original image data. Specifically the decoding units 224-1 and 224-2 convert image data 1 and 2 in the formats corresponding to OS1 and OS2 into original image data 1 and 2, respectively, and output the original image data 1 and 2 obtained by the conversion to the image writing unit 226.

The image writing unit 226 receives original image data 1 and 2 independently from the decoding units 224-1 and 224-2 as an input. The image writing unit 226 identifies the OS corresponding to the original image data input thereto in the plurality of pieces of assignment information stored beforehand in the register 228, and specifies the piece of assignment information having an individual display region corresponding to the identified OS. The image writing unit 226 can identify a part of the decoding unit 224 (e.g., decoding unit 224-1) that inputs the original image data as the OS (e.g., OS1) associated with the original image data. The image writing unit 226 may recognize the size of the image of each frame indicated by the original image data, and may specify assignment information having the individual display area corresponding to the size. The following mainly describes, as an example, the case where the image writing unit specifies assignment information having the individual display area corresponding to the recognized size of the image. Note here that such an example of the case to specify assignment information does not always recognize the size of an image and refers to the recognized size of the image. The image writing unit 226 can count the number of horizontal synchronization signals in the section of one frame between two adjacent vertical blanking intervals from the input original image data as the number of pixels of the frame in the vertical direction. The image writing unit 226 can count the number of signal values between any two adjacent horizontal synchronization signals in the section of one frame as the number of pixels of the frame in the horizontal direction. The individual storage area is a part of the storage area of the image memory 230 that is assigned to each of the original image data.

The image writing unit 226 writes the original image data at the individual storage area of the image memory 230 that is indicated by the specified assignment information.

The register 228 stores at least one piece of assignment information for each OS beforehand. The assignment information indicates the individual storage area assigned to the original image data for each OS. The assignment information in one example associates the storage area of the image memory 230 with the display area of the display panel 250. Specifically the assignment information assigns, to each pixel of the display panel 250, a storage area to store a signal value of the pixel.

The image memory 230 stores image data. The storage area to store the image data is associated with the display area of the display panel. Each pixel in the display area of one frame has a corresponding address, and a signal value of the pixel is stored in the address. The image memory 230 may be a volatile storage medium, such as a SDRAM (Synchronous Dynamic Random Access Memory).

The timing signal generation unit 232 generates a timing signal having a predetermined clock frequency and outputs the generated timing signal to the image reading unit 234. The timing signal generation unit 232 includes a clock circuit that generates a multiphase clock signal as a timing signal, and the multiphase clock signal has the reading period for each pixel, the line period for each line and the frame period for each frame.

The image reading unit 234 reads the image data stored in the image memory 230 frame by frame in synchronization with the timing signal input from the timing signal generation unit 232. The image reading unit 234 reconfigures the image data read in synchronization with the timing signal. For the reconfiguration, the image reading unit 234 inserts a vertical synchronization signal at the head of each frame and inserts a horizontal synchronization signal into each line. The image reading unit 234 has the number of lines for each frame and the number of pixels for each line that are set beforehand. The number of lines for each frame and the number of pixels for each line correspond to the number of pixels in the vertical direction and the number of pixels in the horizontal direction, respectively, that are disposed in the display panel 250. Image data contains a signal value for each pixel of one line. To reconfigure the image data, the image reading unit may perform well-known signal processing of the signal value for each pixel, such as gamma correction. The image reading unit 234 outputs the reconfigured image data to the display driving unit 240 via the image output unit 236. The image data is RGB data that has a RGB value for each pixel as a signal value, for example. The RGB value is a signal value indicating the brightness of each of three primary colors (red, green and blue) as the components of colors.

The image output unit 236 is interface to output the image data input from the image reading unit 234 to the display driving unit 240.

Based on the image data input from the image reading unit 234 via the image output unit 236, the display driving unit 240 applies voltage corresponding to the designated brightness for each pixel. The display driving unit 240 is a source driver, for example.

The display panel 250 has a substantially rectangular display area on the principal surface, where a plurality of pixels is arranged two-dimensionally. The plurality of pixels is arranged at regular intervals in both of the vertical direction and the horizontal direction. The display driving unit 240 applies voltage to each pixel. The display panel 250 may be any display device, such as a LCD (Liquid Crystal Display) or an OLED (Organic Electro-Luminescence Display).

Figures 3, 4:
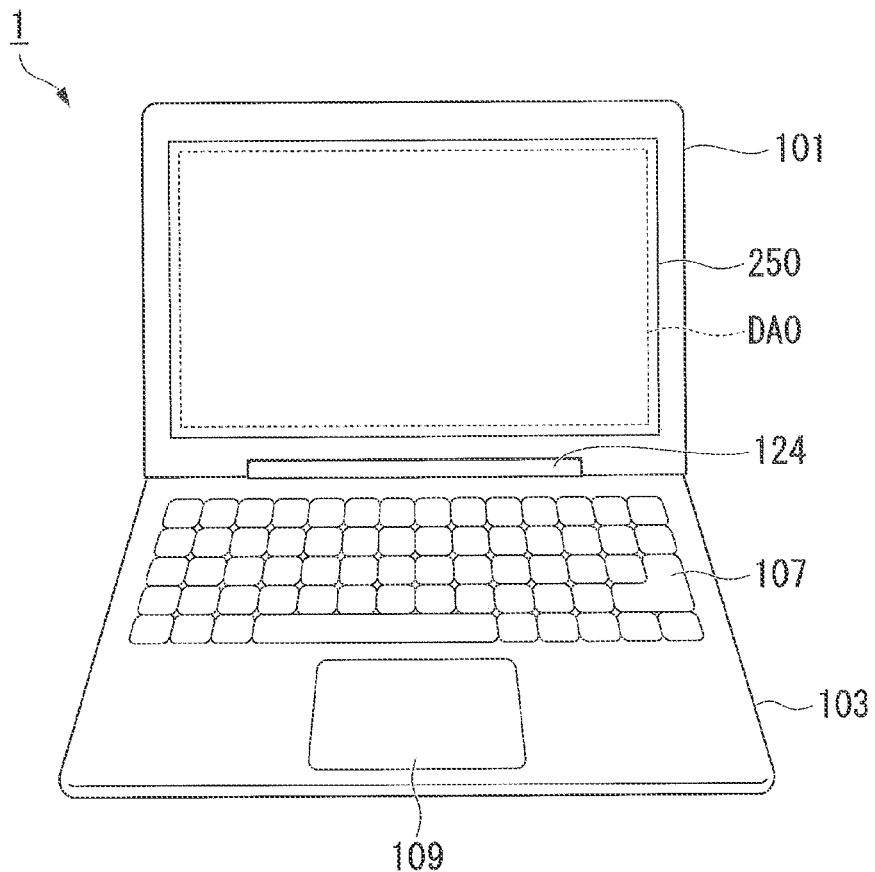
FIG. 3 is a perspective view from the front of the external structure of the information processing device according to the present embodiment.
FIG. 4 shows a first example of assignment information according to the present embodiment.

Next the following describes an example of the external structure of the information processing device 1 according to the present embodiment. FIG. 3 is a perspective view from the front of the external structure of the information processing device 1 according to the present embodiment.

In the example of FIG. 3, the information processing device 1 is configured as a laptop personal computer (hereinafter called a laptop PC). The laptop PC (Personal Computer) may be called a clam shell PC or a notebook PC. The information processing device 1 is not limited to the laptop PC, which may be a tablet PC or a smart phone.

In the example of FIG. 3, the information processing device 1 includes a first chassis 101, a second chassis 103 and a hinge mechanism 124. One side of a lateral face of the first chassis 101 and one side of a lateral face of the second chassis 103 are joined via the hinge mechanism 124. The hinge mechanism 124 has an elongated shape, and has a rotary shaft in the longitudinal direction. The first chassis 101 can rotate around the rotary shaft relative to the second chassis 103. That is, the angle (hereinafter "opening angle") between one of the principal surfaces of the first chassis 101 and one of the principal surfaces of the second chassis 103 is variable. Note here that one of the two principal surfaces of each of the first chassis 101 and the second chassis 103 is called an "inner surface" and the other surface is called a "surface". When the inner surfaces of the first chassis 101 and the second chassis 103 are opposed, i.e., the opening angle is larger than a predetermined threshold angle (e.g., 60° to 90°), the first chassis 101 is open relative to the second chassis 103.

One of the first chassis 101 and the second chassis 103 (e.g., the second chassis 103) stores the system device 110 and a part of the devices (e.g., the BIOS memory 122, the HDD 123, the audio system 125, the WLAN card 126, the input unit 132, the power-supply circuit 133 and the sensor unit 135). The other chassis of the first chassis 101 and the second chassis 103 (e.g., the first chassis 101) stores other devices (e.g., the display unit 200).

On the inner surface of the first chassis 101, the display panel 250 is disposed. The display area DA0 of the display panel 250 occupies the most of the inner surface of the first chassis 101. On the inner surface of the second chassis 103, a keyboard 107 and a touchpad 109 are disposed. The keyboard 107 and the touchpad 109 are examples of the input unit 132. Typically when the first chassis 101 is open relative to the second chassis 103, the system device 110 displays an image on the display panel 250 and receives an operating signal from the input unit 132.

(Assignment Information)

Next an example of the assignment information stored in the register 228 is described below. FIG. 4 shows a first example of the assignment information according to the present embodiment.

In the example of FIG. 4, the assignment information contains IDs, priority, OSs, origins and sizes as element information, which are associated with each other. The IDs are identifiers to identify the assignment information. In the following description, assignment information corresponding to ID1, 2 and 3 of FIG. 4 is called assignment information 1, 2 and 3, respectively. IDs may be omitted for each piece of the assignment information. The priority indicates the rank for priority of the assignment information when the corresponding original image data is written in the image memory 230. In the example of FIG. 4, the priority increases in the order of assignment information 1, 2 and 3, and assignment information 3 has the highest degree of priority. A smaller value of the degree of priority shows a higher degree of priority. Priority may be omitted for each piece of the assignment information. In that case, priority may be specified based on the order of arrangement of the assignment information in the register 228. For instance, the image writing unit 226 may determine that a piece of assignment information stored in a lower line shown in FIG. 4 has a higher degree of priority. When a certain part of the storage area is included in the individual storage area designated by each of the plurality of pieces of assignment information, the image writing unit 226 writes the original image data corresponding to the OS associated with the highest degree of priority. The fields of OSs show the OS information on the OS that provides the image data to be written. The fields of origins and sizes show the individual storage areas. The individual storage area means an area that can be assigned to the original image data corresponding to the OS. The fields of origins in FIG. 4 designate the coordinates of the upper left corner of the individual storage area as the position of the origin that is the reference position of the individual storage area. The fields of sizes designate the numbers of pixels in the horizontal direction and in the vertical direction that are the size of the range of the individual display area corresponding to the individual storage area. This example assumes that the individual display area has a rectangular shape.

Note here that the video subsystem 117 may configure the same assignment information as the assignment information stored in the register 228 beforehand. To create image data for each OS, the video subsystem 117 refers to any one piece of the assignment information corresponding to the OS and creates image data indicating an image having the size of the individual display area designated by the one piece of assignment information. For instance, the video subsystem 117 refers to assignment information 2 as the image data corresponding to OS1 and creates image data indicating an image having the size of 1920 pixels in the horizontal direction×320 pixels in the vertical direction. The assignment information that the video subsystem refers to may be designated with a command of the OS or of an AP that the system device 110 executes.

(Examples of Writing Processing)

Next the following describes a specific example of the writing processing of image data according to the present embodiment.

The image writing unit 226 recognizes sizes 1 and 2 of original image data 1 and 2 input from the decoding units 224-1 and 224-2, and specifies assignment information that indicates the range matching with sizes 1 and 2 and corresponding the OSs from the assignment information stored in the register 228. In a first example, assume the case where original image data 1 in parallel with original image data 2 are input to the image writing unit 226, where original image data 1 indicates image 1 having the size of 1920 pixels in the horizontal direction×320 pixels in the vertical direction and original image data 2 indicates image having the size of 1920 pixels in the horizontal direction×1080 pixels in the vertical direction. In such a case, the image writing unit 226 specifies assignment information indicating the size of 1920 pixels in the horizontal direction×320 pixels in the vertical direction and indicating OS1 from the assignment information shown in FIG. 4. The image writing unit 226 also specifies assignment information 3 indicating the size of 1920 pixels in the horizontal direction×1080 pixels in the vertical direction and indicating OS2, from the assignment information shown in FIG. 4.

Figure 5:
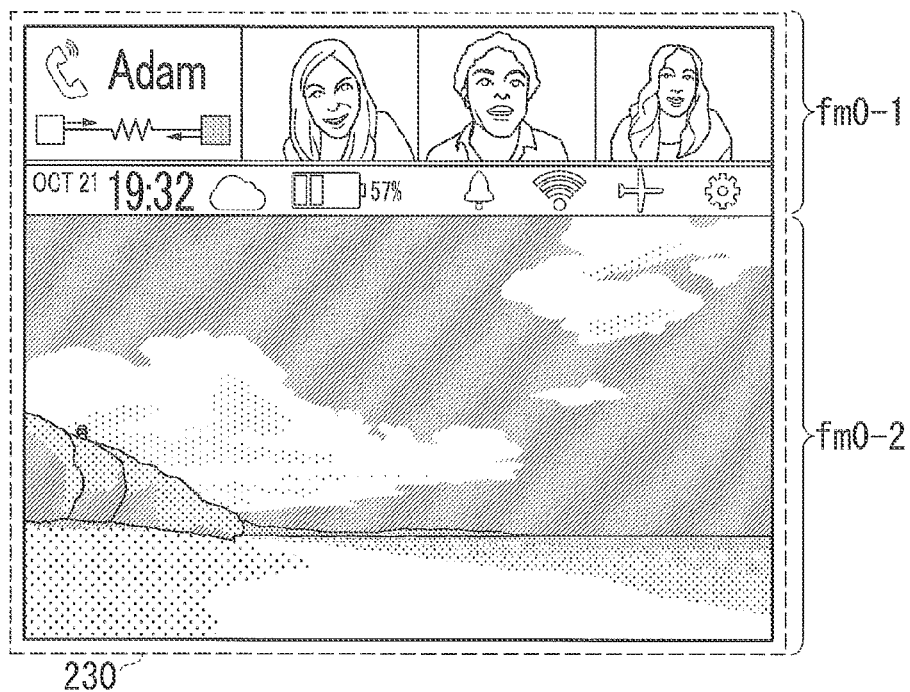
FIG. 5 shows a first example of an individual storage area according to the present embodiment.

The image writing unit 226 specifies the individual storage area corresponding to the individual display area indicated by the specified assignment information in the storage area of the image memory 230, and writes the original image data that is used for specification of the assignment information. For instance, the image writing unit 226 writes original image data 1 in the individual storage area fm0-1 designated by assignment information 2 and original image data 2 in the individual storage area fm0-2 designated by assignment information 3 (FIG. 5). In the example of FIG. 5, the storage area of the images of one frame includes the individual storage areas of fm0-1 and fm0-2. The image memory 230 therefore stores image data indicating one frame that is a combination of original image data 1 and 2.

The image reading unit 234 reads the image data indicating the images combined in one frame from the image memory 230, and outputs the read image data to the display panel 250.

The display panel 250 displays an image based on the image data input from the image reading unit 234. FIG. 6 shows a display example of the image in one frame in the display panel 250. Among these images, image 1 based on original image data 1 and image 2 based on original image data 2 are displayed at the individual display areas im0-1 and im0-2, respectively. Individual display area im0-1 is a display area corresponding to the individual storage area fm0-1 designated by assignment information 2. This display area has the origin of (0, 0) and the range of 1920 pixels in the horizontal direction×1080 pixels in the vertical direction. Individual display area im0-2 is a display area corresponding to the individual storage area fm0-2 designated by assignment information 3. This display area has the origin of (0, 320) and the range of 1920 pixels in the horizontal direction×1080 pixels in the vertical direction.

In a second example, assume the case where while original image data 2 is input to the image writing unit 226, original image data 1 is not input. The original image data 2 indicates image 2 having the size of 1920 pixels in the horizontal direction×1400 pixels in the vertical direction. In such a case, the image writing unit 226 specifies assignment information 1 indicating the size of 1920 pixels in the horizontal direction×1400 pixels in the vertical direction and indicating OS2 from the assignment information shown in FIG. 4.

Figure 7:
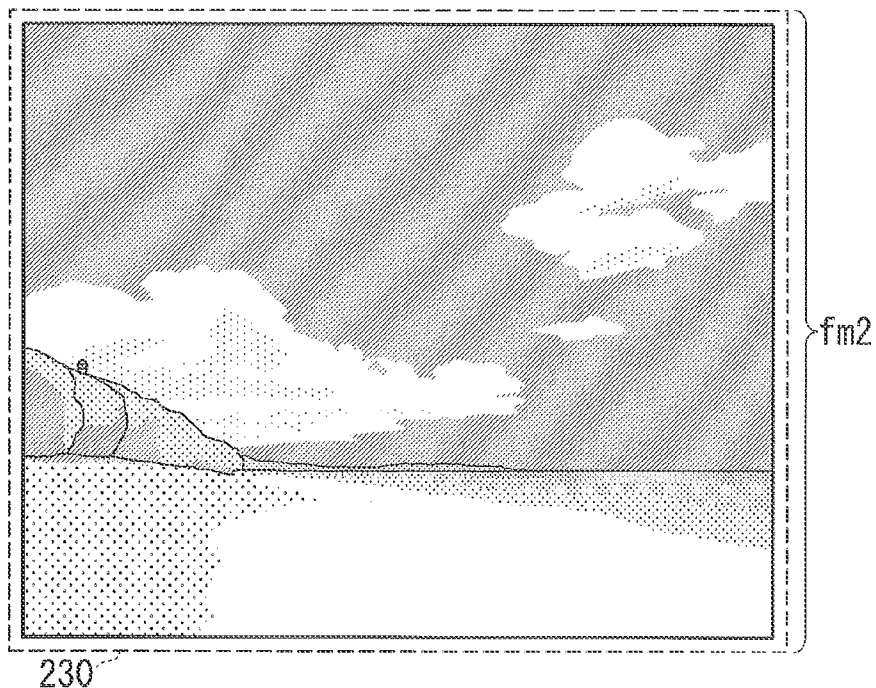
FIG. 7 shows a second example of an individual storage area according to the present embodiment.

The image writing unit 226 writes original image data 2 in the individual storage area fm2 designated by assignment information 1 (FIG. 7).

Figure 8:
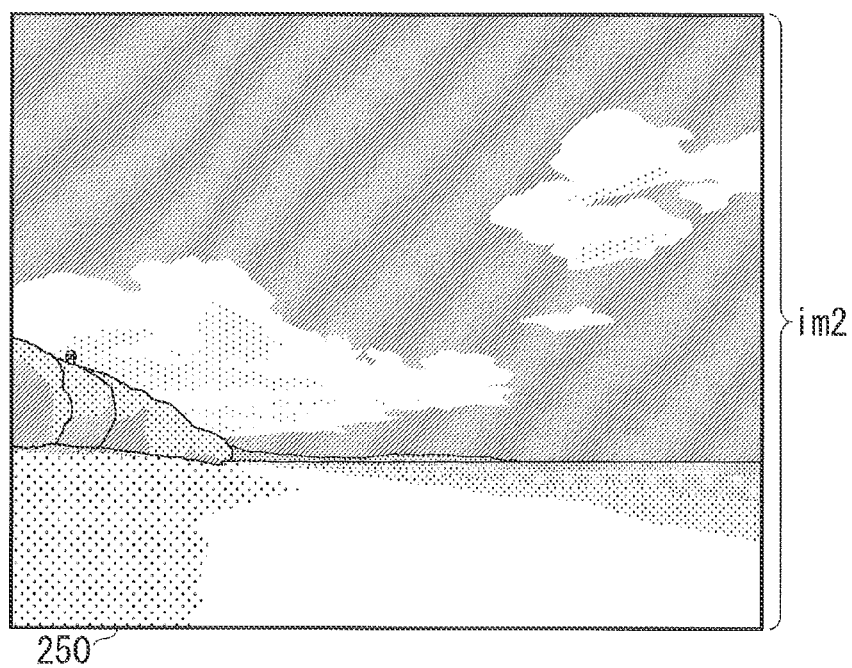
FIG. 8 shows a second display example of an image according to the present embodiment.

The display panel 250 displays image 2 based on original image data 2 as the image data input from the image reading unit 234. FIG. 8 shows a display example of image 2. Image 2 is displayed in the individual display area im2. Individual display area im2 is a display area corresponding to the individual storage area fm2 designated by assignment information 1. This display area has the origin of (0, 0) and the size of 1920 pixels in the horizontal direction×1400 pixels in the vertical direction.

Figures 9, 10:
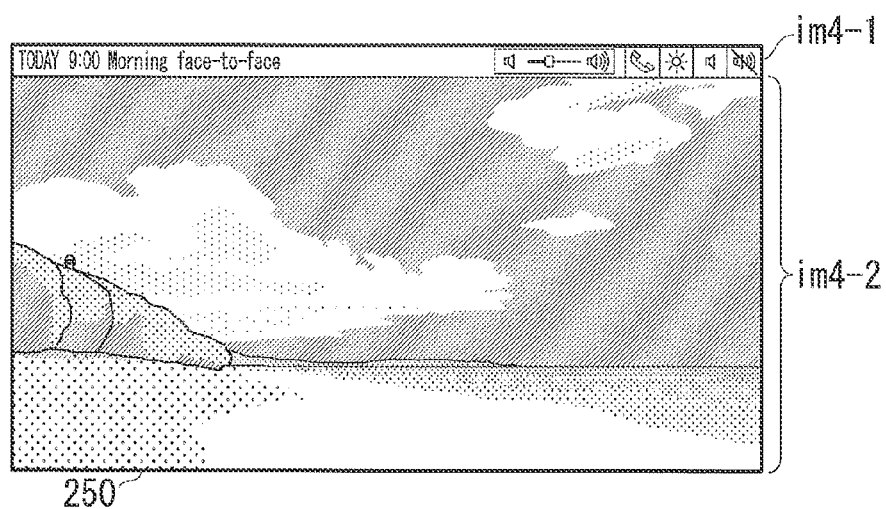
FIG. 9 shows a second example of assignment information according to the present embodiment.
FIG. 10 shows a third display example of an image according to the present embodiment.

The assignment information and the size of the display area of the display panel 250 are not limited to the above-stated example. FIG. 9 shows another example of the assignment information. In this example, the display area of the display area 250 is 1920 pixels in the horizontal direction×1486 pixels in the vertical direction.

In a third example, assume the case where original image data 1 and original image data 2 are input to the image writing unit 226, where original image data 1 indicates image 1 having the size of 1920 pixels in the horizontal direction×46 pixels in the vertical direction and original image data 2 indicates image 2 having the size of 1920 pixels in the horizontal direction×1440 pixels in the vertical direction. In such a case, the image writing unit 226 specifies assignment information 2 for original image data 1 from the assignment information shown in FIG. 9, which indicates the size of 1920 pixels in the horizontal direction×46 pixels in the vertical direction and indicates OS1. The image writing unit 226 specifies assignment information 3 for original image data 2, which indicates the size of 1920 pixels in the horizontal direction×1440 pixels in the vertical direction and indicates OS2.

The image writing unit 226 writes original image data in the individual storage area fm4-1 designated by assignment information 2 and original image data 2 in the individual storage area fm4-2 designated by assignment information 3.

The display panel 250 displays image 1 based on original image data 1 and image 2 based on original image data 2 as the images based on the image data input from the image reading unit 234. As shown in FIG. 10, image 1 and image 2 are displayed in the individual display areas im4-1 and im4-2, respectively. Individual display area im4-1 is a display area corresponding to the individual storage area fm4-1 (not illustrated) designated by assignment information 2. This display area has the origin of (0, 0) and the size of 1920 pixels in the horizontal direction×46 pixels in the vertical direction. Individual display area im4-2 is a display area corresponding to the individual storage area fm4-2 (not illustrated) designated by assignment information 3. This display area has the origin of (0, 320) and the size of 1920 pixels in the horizontal direction×1440 pixels in the vertical direction. As stated above, the individual display area im4-1 is distributed along one side in the horizontal direction in the display area as a whole. The individual display area im4-1 has the width in the vertical direction that is sufficiently narrower than the width in the vertical direction of the display area as a whole. This display area therefore can be used as a virtual camera notch.

In a fourth example, assume the case where while original image data 2 is input to the image writing unit 226, original image data 1 is not input. The original image data 2 indicates image 2 having the size of 1920 pixels in the horizontal direction×1486 pixels in the vertical direction. In such a case, the image writing unit 226 specifies assignment information 1 indicating the size of 1920 pixels in the horizontal direction×1486 pixels in the vertical direction and indicating OS2 from the assignment information shown in FIG. 9.

The image writing unit 226 writes original image data 2 in the individual storage area fm4 designated by assignment information 1.

Figures 11, 12:
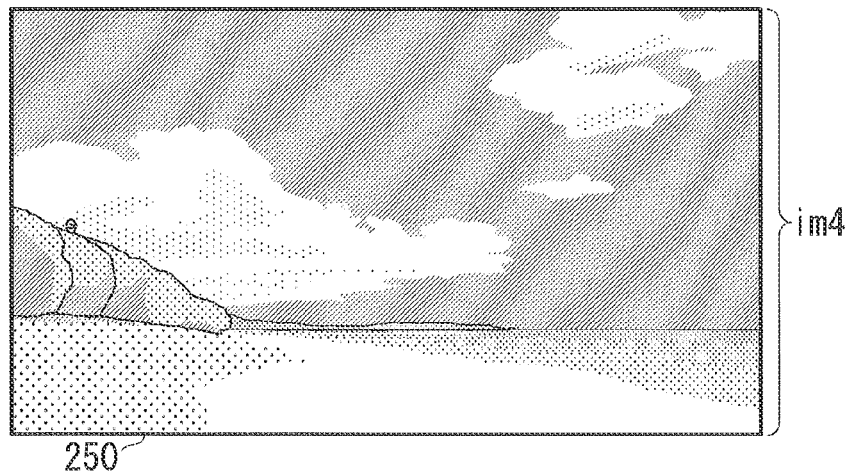
FIG. 11 shows a fourth display example of an image according to the present embodiment.
FIG. 12 shows a third example of assignment information according to the present embodiment.

The display panel 250 displays image 2 based on original image data 2 as the image data input from the image reading unit 234. FIG. 11 shows a display example of image 2. Image 2 is displayed in the individual display area im4. Individual display area im4 is a display area corresponding to the individual storage area fm4 (not illustrated) designated by assignment information 1. This display area has the origin of (0, 0) and the size of 1920 pixels in the horizontal direction×1486 pixels in the vertical direction.

The third example and the fourth example can be switched in accordance with the image data input to the image writing unit 226, which can control whether a virtual camera notch is generated or not. Such a control example may be executed for the display panel 250 that does not have a bezel.

(Copying of Image Data)

One piece of assignment information is not limited to one individual storage area, and may indicate a plurality of individual storage areas. Writing of common image data may be designated for the plurality of individual storage areas. Assignment information 4 and 5 corresponding to ID4 and 5 of FIG. 12 designates a first individual display area and a second individual display area. Assignment information 4 and 5 is different from assignment information 1 to 3 corresponding to ID1 to 3, respectively, in this point. The first individual display area is an area to write the input image data. The second individual display area is an area to make a copy (Destination) of the image data that is written in the first individual display area as Source. Hereinafter assignment information 4 and 5 may be called copy assignment information, which is distinguished from assignment information 1 to 3 that is normal assignment information. For assignment information 4, both of OS1 and OS2 are designated as the OSs that provide the image data to be written. The degrees of priority of assignment information 4 and 5 as the copy assignment information are higher than the degrees of priority of assignment information 1 to 3. The system device 110 also may store assignment information 4 and 5 beforehand.

When referring to assignment information 4 of the plurality of pieces of assignment information stored in the register 228, the image writing unit 226 determines whether the size of an image indicated by the input image data is equal to the size of the first individual display area or not. In a fifth example, assume the case where original image data 1 and original image data 2 are input to the image writing unit 226, where original image data 1 indicates image 1 having the size of 1920 pixels in the horizontal direction× 320 pixels in the vertical direction and original image data 2 indicates image 2 having the size of 1920 pixels in the horizontal direction×1080 pixels in the vertical direction.

In such a case, the image writing unit 226 selects assignment information 4 indicating an individual display area having the same size as that of the image 1 or indicating the first individual display area having the same size as a candidate for the assignment information to be referred to for writing of original image data 1. The image writing unit 226 then compares the degree of priority between assignment information 2 and assignment information 4, and selects assignment information 4 having a higher degree of priority. The image writing unit 226 selects assignment information 3 indicating an individual display area having the same size as that of the image 2 as the assignment information to be referred to for writing of original image data 2.

Figure 13:
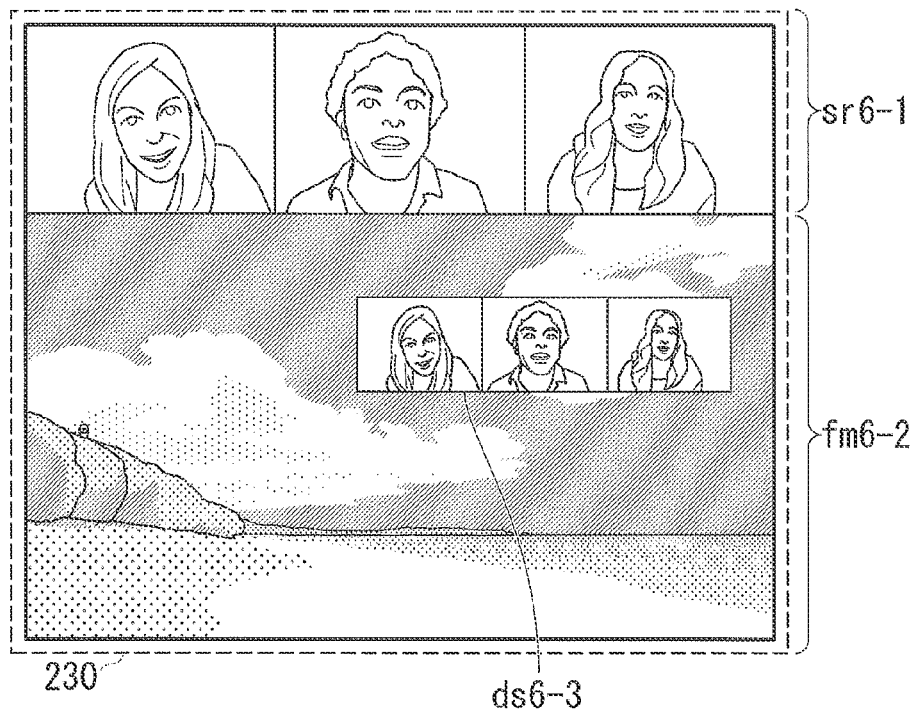
FIG. 13 shows a fifth example of an individual storage area according to the present embodiment.
Figure 14:
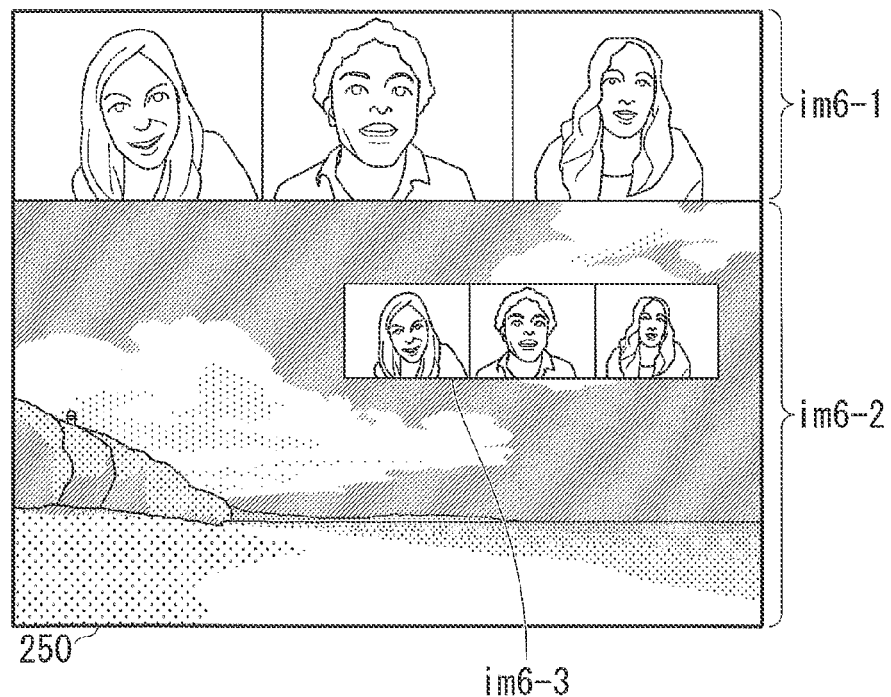
FIG. 14 shows a fifth display example of an image according to the present embodiment.

As shown in FIG. 13, the image writing unit 226 writes original image data 1 in the first individual storage area sr6-1 indicated by the selected assignment information 4. The first individual storage area sr6-1 corresponds to the first individual display area im6-1 (FIG. 14). The image writing unit 226 writes original image data 2 in the individual storage area fm6-2 indicated by the selected assignment information 3. The individual storage area fm6-2 corresponds to the individual display area im6-2 (FIG. 14). The image writing unit 226 then writes the copy image data obtained by copying the original image data 1 in the second individual storage area ds6-3 indicated by assignment information 4. The second individual display area im6-3 corresponding to the second individual storage area ds6-3 overlaps with a part of the individual display area im6-2. Since the degree of priority of assignment information 4 is higher than that of assignment information 3, the image writing unit 226 preferentially writes (overwrites) the copy image data based on original image data 1 instead of original image data 2 written in the second individual storage area ds6-2 in the second individual display area im6-3. That is, at an overlapping part of the plurality of individual storage areas, the image writing unit 226 may write or copy original image data corresponding to the OSs designated by assignment information at the individual storage area so that a piece of assignment information having a higher degree of priority is written later than another piece of assignment information having a lower degree of priority. At a part of the individual storage area designated by the selected assignment information that is not overlapped with another individual storage area, the image writing unit 226 writes original image data corresponding to the designated OS even when the degree of priority designated by the assignment information is low, and does not overwrite it with original image data corresponding to another OS.

When the first individual display area and the second individual display area are different in size of the range as in assignment information 4, the image writing unit 226 adjusts the size of the original image indicated by original image data 1 to be written in the first individual display area in both of the horizontal direction and the vertical direction, and creates copy image data showing a copy image having the adjusted size indicated by the second individual display area. Such an original image simply adjusted in size has the coordinate values of each pixel (hereinafter called adjusted pixels) that are not always integral multiples of the pixel pitch. This means that simple adjustment of the size may fail to obtain a signal value of each pixel in the second individual display area. In that case, the image writing unit 226 may calculate a signal value of each pixel of the copy image by performing interpolation of a signal value of each adjusted pixel in a predetermined range from the pixel. Magnification in the horizontal direction may be the ratio of the number of pixels in the horizontal direction in the second individual display area to the number of pixels in the horizontal direction in the first individual display area. Magnification in the vertical direction may be the ratio of the number of pixels in the vertical direction in the second individual display area to the number of pixels in the vertical direction in the first individual display area. The image writing unit 226 configures data indicating a signal value of each calculated pixel as the copy image data. Methods of interpolation are any one of bilinear interpolation and bicubic interpolation, for example.

Note here that the examples shown in FIG. 13 and FIG. 14 do not require interpolation because the magnification in the horizontal direction and the magnification in the vertical direction are ½ and ½, respectively. The image writing unit 226 then can drop a signal value of every second pixel from the signal values of pixels making up original image data 1 to be written in the first individual display area so as to create the copy image data.

Modified Examples

Figure 15:
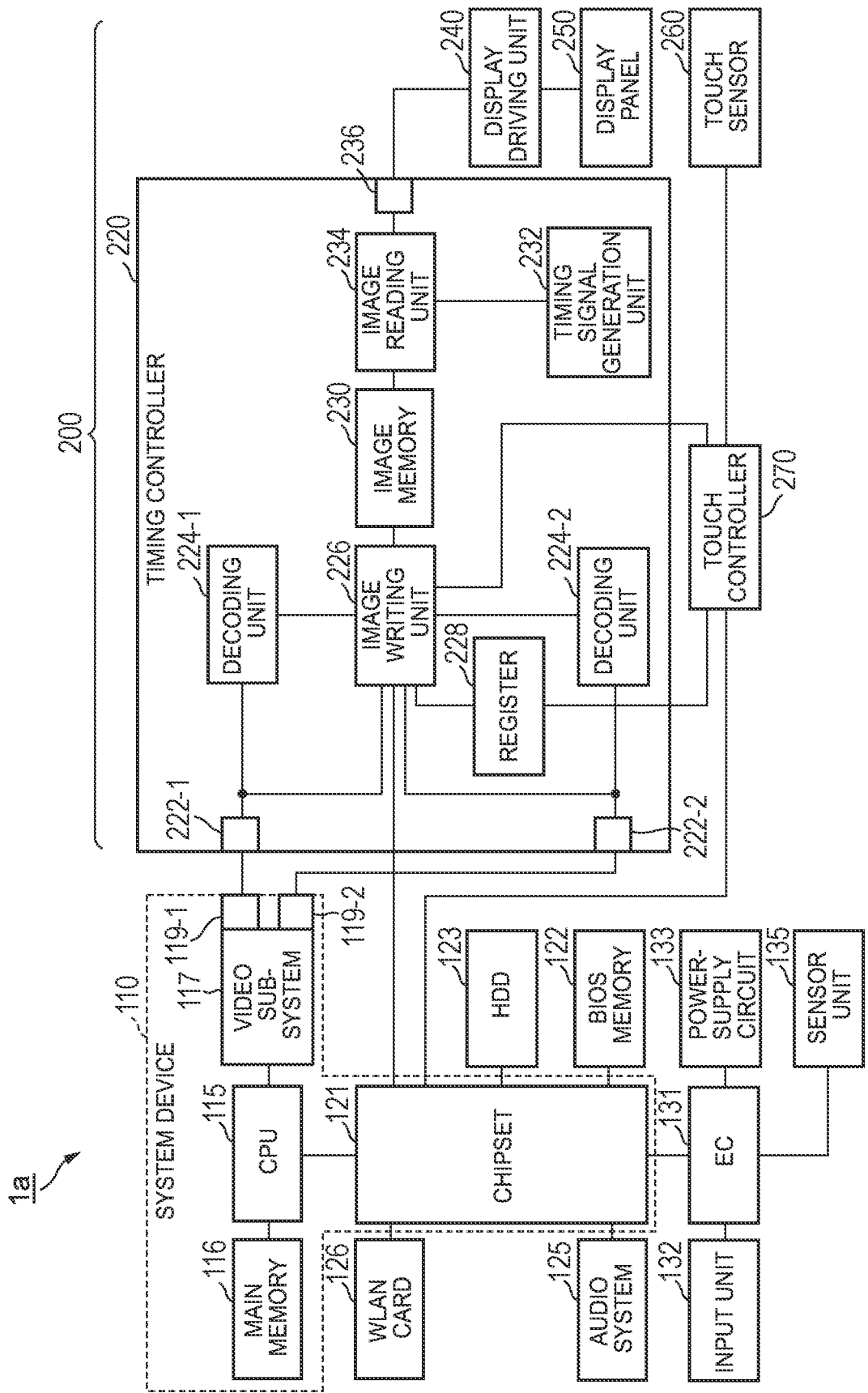
FIG. 15 is a block diagram schematically showing one example of the functional configuration of the information processing device according to a modified example of the present embodiment.

Next the following describes modified examples of the present embodiment. An information processing device 1a according to the present modified example includes a movable mechanism (e.g., a hinge mechanism 124a shown in FIG. 17 and FIG. 18) that can mechanically change the form of the device. The information processing device 1a includes a plurality of chassis. The movable mechanism changes the arrangement of the plurality of chassis as to whether a part of the chassis mechanically shields or not a partial area as a part of the display area of the display panel 250. The display panel 250 has a non-shielding area that is exposed without shielding by the part of the chassis, and the non-shielding area does not belong to the partial area of the display area. The EC 131 determines whether the partial area is shielded or not based on a detection signal from the sensor unit 135, and outputs a shielding determination signal indicating whether the partial area is shielded or not to the image writing unit 226 via the chipset 121 (FIG. 15). An example of the configuration of the information processing device 1a and an example to detect shielding of the partial area are described later.

When the shielding determination signal from the EC 131 indicates the shielding of a partial area, the image writing unit 226 specifies assignment information indicating a first individual display area that is partially or entirely included in the partial area and has a size equal to the size of an image indicated by the input original image data. The image writing unit 226 then writes the copy image data obtained by copying the original image data in the individual storage area corresponding to a second individual display area. When the first individual display area and the second individual display area are different in size, the image writing unit 226 may adjust the size of the original image indicated by image data to be written in the first individual display area as stated above so as to create copy image data.

In this way, when the first individual display area is shielded as well, an image based on the original image data to be input in the second individual display area can be displayed.

(Examples of Display)

Figure 16:
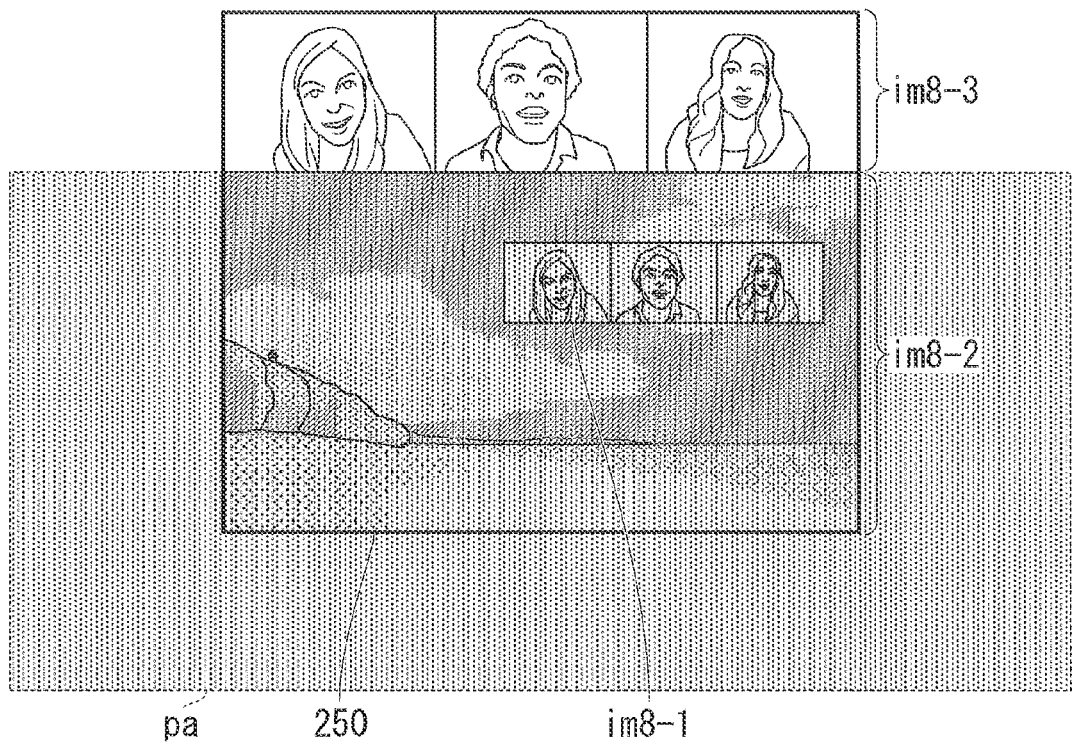
FIG. 16 shows a display example of an image according to a modified example of the present embodiment.

Next the following describes a display example of an image when a partial area is shielded. The example of FIG. 16 assumes the case where original image data 1 and original image data 2 are input in the image writing unit 226. A first individual display area im8-1, an individual display area im8-2 and a second individual display area im8-3 shown in FIG. 16 correspond to the second individual display area im6-3, the individual display area im6-2 and the first individual display area im6-1, respectively, shown in FIG. 14. Note here that in the example of FIG. 16 the partial area pa of the display area of the display panel 250 is an area that may be shielded, and the area other than the partial area is a non-shielding area. In the display area of the display panel 250, while the first individual display area im8-1 and the individual display area im8-2 are included in the partial area pa, the second individual display area im8-3 is not included in the partial area pa.

When the shielding determination signal from the EC 131 indicates the shielding of the partial area, the image writing unit 226 specifies assignment information 5 indicating a first individual display area fm8-1 (not illustrated) corresponding to the first individual display area im8-1 that is included in the partial area pa and has a size of the range equal to the size (960 pixels in horizontal direction×160 pixels in vertical direction) of image 1 indicated by the original image data 1. Assignment information 5 is copy assignment information, and indicates the first individual storage area fm8-1 as well as the second individual storage area fm8-3 (not illustrated). The image writing unit 226 then stores the copy image data obtained by copying the original image data 1 in the second individual storage area fm8-3. Accordingly also when the partial area pa is shielded, the second individual display area im8-3 outside of the partial area pa can display an image similar to image 1.

The image writing unit 226 writes original image data 2 in the individual display area fm8-2 (not illustrated) corresponding to the individual display area im8-2 indicated by assignment information 3 similarly to the example of FIG. 13. Image 2 based on original image data 2 is shielded.

Note here that when the shielding determination signal from the EC 131 indicates the shielding of a partial area, and when the selected individual display area is included in the partial area, the image writing unit 226 may not write image data in the individual storage area corresponding to the individual display area. In that case, the image reading unit 234 may not read the image data in the storage area included in the partial area. This can avoid displaying of an unnecessary image.

(Detection of Contact Position)

The information processing device 1, 1a according to the present embodiment may include a touch sensor 260 and a touch controller 270 (FIG. 15). The touch sensor 260 may be integrated with the display panel 250 as a single touch screen. The touch sensor 260 has a detection area enabling the detection of a contact position in contact with another object. The detection area of the touch sensor 260 overlaps with the display area of the display panel 250. The touch sensor 260 outputs a detection signal indicating a contact position to the touch controller 270. The touch sensor 260 may be based on any operating principle, including a capacitive touch type, a source acoustic wave type and a resistive touch type.

The touch controller 270 functions as a contact controller to control the detection state of a contact position by the touch sensor 260. In the present embodiment, a partial area including the first individual display area may be shielded and the image writing unit 226 may write copy image data obtained by copying image data indicating an image having a size equal to the first individual display area in the individual storage area corresponding to the second individual display area. Since the image is displayed in the second individual display area, the touch sensor 260 may detect a contact position in the range of the second individual display area. In that case, the touch controller 270 converts the contact position in the second individual display area into a corresponding contact position in the first individual display area. For instance, when a detection signal indicating the right upper corner of the second individual display area im8-3 (FIG. 16) as the contact position is acquired, the touch controller 270 converts the contact position into a contact position at the right upper corner of the first individual display area im8-1. To convert a contact position, the touch controller 270 may perform linear transformation from the second individual display area to the first individual display area, for example. The mapping indicating this linear transformation is defined by the copy assignment information used to copy image data. The touch controller 270, for example, may specify image data indicating an image having a size equal to the first individual display area based on the shielding determination signal from the EC 131 via the chipset 121 and the copy assignment information from image writing unit 226, and may determine whether the copy image data obtained by copying the specified image data is to be written in the individual storage area corresponding to the second individual display area.

The chipset 121 outputs the shielding determination signal from the EC 131 to the touch controller 270. When the image writing unit 226 writes copy image data obtained by copying image data indicating an image having a size equal to the first individual display area in the individual storage area corresponding to the second individual display area, the image writing unit 226 outputs the copy assignment information indicating the first individual display area and the second individual display area to the touch controller 270.

The touch controller 270 outputs position information indicating the converted contact position to the chipset 121. In this way, when the first individual display area is shielded and a copy image is displayed in the second individual display area, the system device 110 can acquire position information indicating the contact position that is converted from the second individual display area to the first individual display area. This means that OS or various types of programs executed on the OS may be designed while considering the acquisition of a contact position in the first individual display area, and this does not always require the consideration of shielding of the first individual display area and the conversion of the contact position in the second individual display area into a corresponding contact position in the first individual display area.

When a partial area including the first individual display area is not shielded or copy image data is not written in the individual storage area corresponding to the second individual display area, the touch controller 270 does not convert the contact position and outputs position information indicating the contact position to the chipset 121.

(Examples of External Structure)

Figure 17:
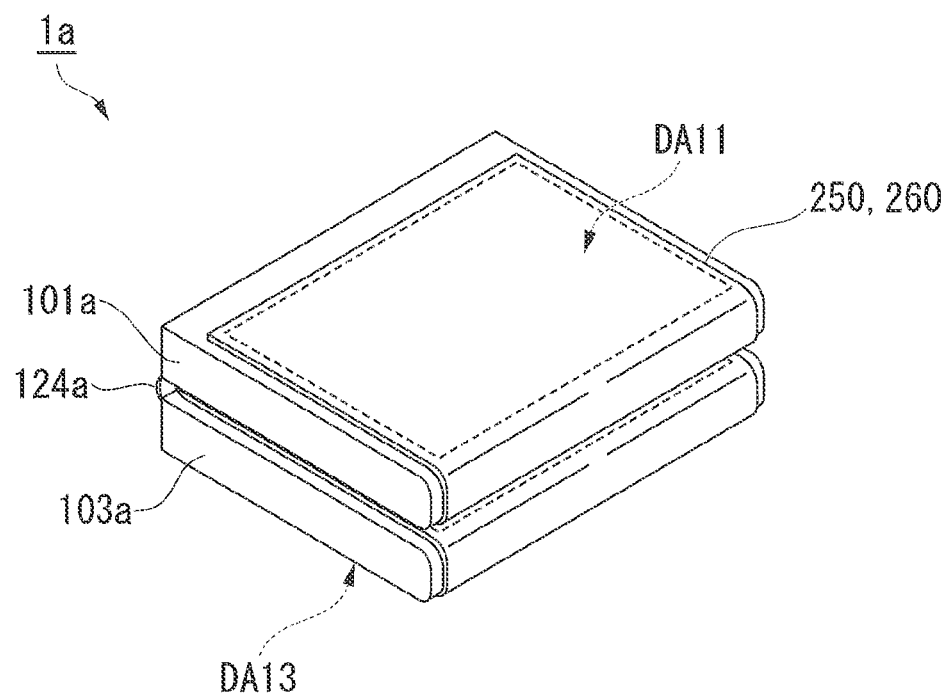
FIG. 17 is a perspective view of an example of the external structure of the information processing device according to a modified example of the present embodiment when the device is folded.
Figure 18:
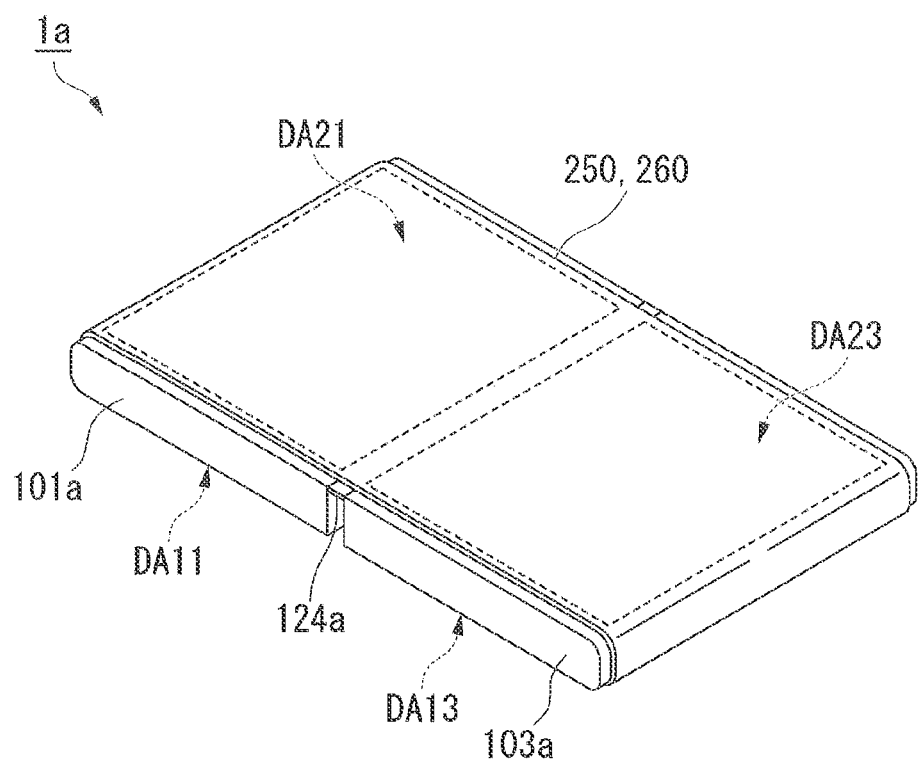
FIG. 18 is a perspective view of an example of the external structure of the information processing device according to a modified example of the present embodiment when the device is open.

Next the following describes an example of the external structure of the information processing device 1a. FIG. 17 and FIG. 18 are perspective views of examples of the external structure of the information processing device 1a.

The information processing device 1a includes a first chassis 101a, a second chassis 103a and a hinge mechanism 124a. One side of a lateral face of the first chassis 101a and one side of a lateral face of the second chassis 103a are joined via the hinge mechanism 124a. The hinge mechanism 124a can change the opening angle between the inner surface of the first chassis 101a and the inner surface of the second chassis 103a. This structure of the information processing device 1a can fold the pair of chassis via the hinge mechanism 124a. FIG. 17 shows the folding state of the information processing device 1a, that is, the first chassis 101a is closed relative to the second chassis 103a. FIG. 18 shows the first chassis 101a that is open relative to the second chassis 103a.

One of the first chassis 101a and the second chassis 103a (e.g., the second chassis 103a) stores a system device 110 and a part of the devices (e.g., the BIOS memory 122, the HDD 123, the audio system 125, the WLAN card 126, the input unit 132, the power-supply circuit 133 and the sensor unit 135).

On the surface and the inner surface of each of the first chassis 101a and the second chassis 103a, a series of display panel 250 is disposed. Of the display area of the display panel 250, a part included in the inner surface of the first chassis 101a, a part included in the surface of the first chassis 101a, a part included in the inner surface of the second chassis 103a and a part included in the surface of the second chassis 103a are called display area DA21, display area DA11, display area DA23 and display area DA13, respectively. When the first chassis 101a is closed relative to the second chassis 103a, the display areas DA21 and DA23 are shielded by the second chassis 103a and the first chassis 101a, respectively, as their opposed chassis. That is, the display areas DA21 and DA23 are a partial area. The display areas DA11 and DA13 are non-shielding areas.

In this modified example, the EC 131 has a function as a shielding determination unit to determine based on the opening angle as to whether a partial area is shielded or not. The sensor unit 135 includes an open/close sensor, for example. This open/close sensor detects environmental information based on the opening/closing of the first chassis 101a and the second chassis 103a. The information processing device 1a, for example, includes a lid sensor on the front face of one of the first chassis 101a and the second chassis 103a and a permanent magnet on the other front face. The front face is a lateral face on the opposite side of the lateral face to dispose the hinge mechanism 124a. The lid sensor detects magnetic field generated from the permanent magnet and outputs a detection signal indicating the detected magnetic field to the EC 131. When the strength of the magnetic field indicated by the detection signal is larger than a predetermined threshold, the EC 131 determines that the first chassis 101a is closed relative to the second chassis 103a, i.e., the partial area is shielded. When the strength of the magnetic field indicated by the detection signal is the predetermined threshold or less, the EC 131 determines that the first chassis 101 is open relative to the second chassis 103, i.e., the partial area is not shielded.

The sensor unit 135 may include an angular sensor. This angular sensor detects the opening angle between the first chassis 101a and the second chassis 103a. The information processing device 1a includes such an angular sensor at the hinge mechanism 124a, for example. The angular sensor detects torque generated at the hinge mechanism 124a in accordance with the opening angle, and outputs a detection signal indicating the detected torque to the EC 131. When the opening angle corresponding to the torque indicated by the detection signal is larger than a predetermined threshold (e.g., 45° to 60°), the EC 131 determines that the partial area is shielded. When the open/close angle is the predetermined threshold or less, the EC 131 determines that the partial area is not shielded.

The detection signal as stated above can be considered as information indicating whether the first chassis 101a and the second chassis 103a are folded or not. The EC 131 therefore may omit the processing of determining whether the first chassis 101a is open relative to the second chassis 103a based on the detection signal from the sensor unit 135 and outputting a shielding determination signal based on the determination result to the image writing unit 226. Instead of receiving a shielding determination signal from the EC 131 as an input, the image writing unit 226 may determine whether the partial area is shielded or not based on the detection signal from the sensor unit 135 via the EC 131.

As described above, the information processing device 1, 1a according to the present embodiment includes: the timing controller 220; the system device 110 that operates in accordance with at least each of a first OS and a second OS and outputs first original image data from the first OS and second original image data from the second OS to the timing controller 220; and the display panel 250 including a plurality of pixels arranged in a predetermined display area. The timing controller 220 includes: the image memory 230 having a storage area associated with the display area of the display panel 250; the image writing unit 226 that stores the first original image data in an individual storage area assigned to the first OS in the storage area of the image memory 230 and stores the second original image data in an individual storage area assigned to the second OS in the storage area of the image memory 230; and the image reading unit 234 that reads image data stored in the image memory 230 frame by frame, and outputs the image data to the display panel 250.

This configuration allows the first original image data from the first OS and the second original image data from the second OS that are input from the system device 110 to be stored in their individual storage areas assigned to their respective OSs, and allows the stored original image data to be provided to the display panel 250 frame by frame. In this way, an image provided for each of the OSs can be displayed on the single display panel unit 250 without changing the functions of the OSs or APs executed on the OSs.

The information processing device 1, 1a may further include the register 228 that stores a plurality of pieces of assignment information beforehand, and each of the plurality of pieces of assignment information may include OS information, the origin position and the size of an image that can be assigned. The image writing unit 226 may select pieces of assignment information to display the first original image data and the second original image data from the plurality of pieces of assignment information, and may store the first original image data and the second original image data in individual storage areas in accordance with the selected pieces of assignment information.

This configuration allows input original image data to be stored in the individual storage area assigned to the OS corresponding to the original image data. This means that an image based on original image data from an OS can be displayed in the individual display area assigned to the OS.

The plurality of pieces of assignment information may further include information on the degree of priority. When a plurality of individual storage areas is assigned to an overlapping area of storage areas, the image writing unit 226 may store data in the overlapping area while prioritizing an individual storage area corresponding to a piece of assignment information having a higher degree of priority.

This configuration allows, when some pieces of assignment information are selected, original image data based on an OS indicated by a piece of assignment information having a higher degree of priority to be stored preferentially in the individual storage area indicated by the assignment information. This can solve the conflict between a plurality of individual storage areas. Such a conflict may occur when the plurality of individual storage areas is selected depending on the OS associated with the input image data or due to the size of the image data.

At least one piece of the plurality of pieces of assignment information may be copy assignment information to display copy image data that is obtained by copying at least a part of at least one of the first original image data and the second original image data. When the image writing unit 226 selects the copy assignment information, the image writing unit 226 may perform copy processing to store copy image data in an individual storage area in accordance with the selected copy assignment information.

This configuration allows, when the system device 110 provides image data indicating an image having a size equal to the first individual display area corresponding to the first individual storage area, a copy image based on the copy image data to be displayed in the second display area. This can implement a variety of display forms of images without changing the functions of the OSs or APs executed on the OSs.

The information processing device 1a may further include: the pair of chassis 101a and 103a that can be folded via the hinge mechanism 124a; and the sensor unit 135 that detects whether the chassis 101a and 103a are folded or not. The display area of the display panel 250 may include the first display area (first individual display area) that is shielded when the chassis 101a and 103a are folded and the second display area (second individual display area) that is exposed when the chassis are folded. When the chassis 101a and 103a are folded, the image writing unit 226 selects copy assignment information associated with the second display area and performs copy processing.

This configuration allows, when the first display area is shielded by folding the chassis 101a and 103a, a copy image of the image that is to be displayed in the first display area to be displayed in the exposed second display area.

This can display an image according to the intention of the user without interrupting when the first display area is shielded by folding the chassis 101a and 103a so as to shield the first display area.

The information processing device 1a may further include: the touch sensor 260 that detects a contact position in the display area of the display panel 250 in contact with another object; and the contact controller (touch controller 270) that outputs position information indicating the contact position to the system device 110. When the image writing unit 226 performs copy processing, and if the second individual display area associated with the second individual storage area includes the contact position, the contact controller converts the contact position into a corresponding position in the first display area where the original image data as the source of copy is displayed.

This configuration allows, when the first display area is shielded and a contact position is detected in the second display area, the system device 110 to receive a contact position that is converted into the corresponding position in the first display area. This can use the contact position in the first individual display area where the image is to be displayed without changing the functions of the OSs or APs executed on the OSs.

The number of OSs that the processor 112 can execute at the same time is not limited to 2, and may be 3 or more. The number of the image input units 119, the image input units 222 and the decoding units 224 may be equal to or more the number of the OSs that the processor 112 can execute at the same time.

The information processing device 1, 1a may have a different form from the above, such as the position of the display panel 250 and the position of the shielding area.

The number of pieces of assignment information stored in the register 228 may be 4 or 6 or more. The individual assignment area for each OS that is configured in the assignment information may be different from those in FIG. 4, FIG. 9 or FIG. 12.

That is a detailed description of the embodiments of the present invention with reference to the drawings. The specific configuration of the present invention is not limited to the above-described embodiments, and also includes design modifications or the like within the scope of the present invention. The configurations described in the above embodiments can be combined freely.

The invention claimed is:

1. An information processing device, comprising:
a timing controller;
a system device that operates with at least a first operating system (OS) and a second OS, and outputs, to the timing controller, first original image data from the first OS and second original image data from the second OS; and
a display panel including a plurality of pixels arranged in a predetermined display area, wherein:
the timing controller includes:
a memory having a storage area associated with the display area;
wherein the timing controller:
stores the first original image data in a first individual storage area assigned to the first OS in the storage area, and stores the second original image data in a second individual storage area assigned to the second OS in the storage area; and
reads stored image data stored in the storage area, frame by frame, and outputs the stored image data to the display panel;
a register that stores a plurality of pieces of assignment information, wherein:
each of the plurality of pieces of assignment information includes at least an OS information on the first and second OS that provides the first and second original image data to be written, an origin position and a size of an image that can be assigned, and
the timing controller selects pieces of assignment information to display the first original image data and the second original image data from the plurality of pieces of assignment information, and
the timing controller stores the first original image data and the second original image data in respective individual storage areas in accordance with the selected pieces of assignment information.

2. The information processing device according to claim 1, wherein the plurality of pieces of assignment information further includes information on a degree of priority, and
when a plurality of individual storage areas is assigned to an overlapping area of the storage areas, the timing controller stores data in the overlapping area while prioritizing one of the plurality of individual storage areas corresponding to a piece of assignment information having a higher degree of priority.

3. The information processing device according to claim 1, wherein at least one piece of the plurality of pieces of assignment information is copy assignment information to display copy image data that is obtained by copying at least a part of at least one of the first original image data and the second original image data, and
when the timing controller selects the copy assignment information, the timing controller performs copy processing to store the copy image data in one of the plurality of individual storage areas in accordance with the copy assignment information.

4. The information processing device according to claim 3, further comprising:
a pair of chassis that can be folded via a hinge; and
a sensor unit that detects whether the chassis is folded or not, wherein:
the display area includes at least a first display area that is shielded when the pair of chassis is folded and a second display area that is exposed when the chassis are folded, and
when the pair of chassis is folded, the timing controller selects the copy assignment information associated with the second display area and performs the copy processing.

5. The information processing device according to claim 4, further comprising:
a touch sensor that detects a contact position in the display area that can be in contact with another object; and
a touch controller that outputs position information indicating the contact position to the system device, wherein:
when the timing controller performs the copy processing, and when the second display area includes the contact position, the touch controller converts the contact position into a corresponding position in the first display area where original image data as a source of copy is displayed.

6. A method for controlling in an information processing device including: a timing controller; a system device that operates in accordance with at least a first operating system (OS) and a second OS, and outputs, to the timing controller, first original image data from the first OS and second original image data from the second OS; and a display panel including a plurality of pixels arranged in a predetermined display area, the timing controller having a storage area associated with the display area, wherein:
the timing controller performs:
storing the first original image data in a first individual storage area assigned to the first OS in the storage area and storing the second original image data in a second individual storage area assigned to the second OS in the storage area; and
reading image data stored in the storage area, frame by frame, and outputting the image data to the display panel;
storing a plurality of pieces of assignment information:
wherein each of the plurality of pieces of assignment information includes at least an OS information on the first and second OS that provides the first and second original image data to be written, an origin position and a size of an image that can be assigned, and
selecting pieces of assignment information to display the first original image data and the second original image data from the plurality of pieces of assignment information, and
storing the first original image data and the second original image data in respective individual storage areas in accordance with the selected pieces of assignment information.

* * * * *